July 28, 1925.  
W. E. BAKER  
WRIST PIN  
Filed April 9, 1921

1,547,288

Inventor:  
William E. Baker  
By: Wm. O. Belt  
Atty.

Patented July 28, 1925.

1,547,288

UNITED STATES PATENT OFFICE.

WILLIAM E. BAKER, OF ERIE, PENNSYLVANIA.

WRIST PIN.

Application filed April 9, 1921. Serial No. 460,036.

*To all whom it may concern:*

Be it known that I, WILLIAM E. BAKER, a citizen of the United States, residing at Erie, in the county of Erie and State of Pennsylvania, have invented certain new and useful Improvements in Wrist Pins, of which the following is a specification.

My invention relates to internal combustion engines and comprises an improved assembly of a cylinder piston and its connecting rod by means of a rotatable wrist pin.

The main object of my invention is to prolong the effective life of the wrist pin assembly by journaling the pin in the piston and connecting rod whereby, in operation, the bearing surface is always changing and the wear at any one point is reduced accordingly.

Other objects of my invention are to exclude carbon or other foreign matter from the wrist pin journal bearing and to prevent axial movement of the pin. I accomplish these objects by inserting pin retaining plugs in the piston at the ends of the plug and a further object of my invention is to provide retaining means for these plugs.

In the accompanying drawings, I have illustrated a selected embodiment of my invention but do not limit myself to this particular form.

Figure 1:
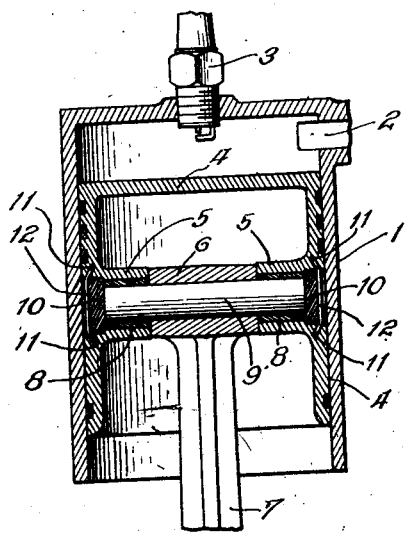
Fig. 1 is a vertical transverse section through a cylinder, piston and wrist pin.
Figure 2:
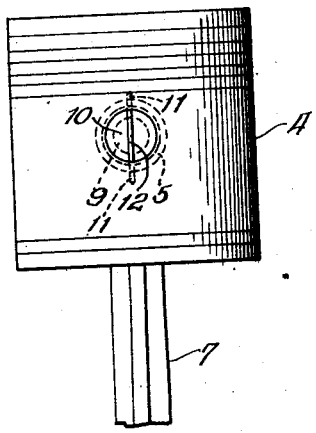
Fig. 2 is a side elevation of a cylinder and connecting rod looking in a direction at right angles to the plane of Fig. 1.

The engine cylinder 1 is of the usual type and is provided with a fuel inlet 2 and spark plug 3. Piston 4 has inwardly extending bosses 5, adapted to receive the end 6 of the connecting rod 7 between them. A passage is drilled through the walls of piston 1, bosses 5 and the end 6 of the piston rod and, preferably, is provided with bushings 8 throughout part of its length. The piston and connecting rod are assembled by a cylindrical wrist pin 9, which is journaled in bushings 8 and in the end 6 of the connecting rod.

The length of pin 9 is less than the outside diameter of the piston and the openings in the side of piston 4 are threaded inwardly a short distance to receive plugs 10 which are screwed therein against the outer ends of bushings 8 and pin 9 and are short enough so that when so positioned, they are either flush or below the surface of the piston. The outer ends of plugs 10 are provided with transverse grooves and after the plugs are screwed in far enough to prevent axial movement of pin 9, but not tight enough to interfere with the rotary movement of the pin, holes 11 are drilled into the piston in alignment with these grooves and plugs 10 are retained in their respective angular positions by means of wires 12 which are seated in the grooves in plugs 10 and the ends of which are inserted in holes 11 in the piston.

During operation of the engine, pin 9 will be rotated intermittently, continually presenting different surfaces in the directions which transmit the force of the explosion from the piston to the connecting rod, thus reducing the wear at every point on the pin and prolonging its usefulness.

The plugs 10 not only retain the wrist pin in position but seal the journal bearings of the pin against the admission of carbon or other dirt from the cylinder to these bearings.

I am aware that changes in the form and construction of parts and details of construction may be made without departing from the invention or sacrificing the advantages thereof and I reserve the right to make all such changes and modifications as are fairly possible within the scope of the following claims.

I claim:

1. In combination, a piston having inwardly projecting bosses, a piston connecting rod located between the bosses, a wrist pin arranged in said bosses and said connecting rod and of less length than the diameter of the piston, plugs screw-threaded in the outer ends of the bosses in abutting relation to the ends of the wrist pin, and means extending transversely of said plugs and engaging the plugs and piston for securing the plugs against rotation.

2. In combination, a piston having inwardly projecting bosses, bushings within said bosses, a piston connecting rod located between the adjacent ends of the bosses and bushings, a wrist pin arranged in said bushings and connecting rod and of less length than the diameter of the piston, plugs screw-threaded in the outer ends of the bosses against the ends of the wrist pin and the outer ends of the bushings, and wires engaged with the plugs and with the piston to prevent rotation of the plugs.

3. In combination, a piston, a piston connecting rod, an aligned passage through said piston and rod, a cylindrical wrist pin journaled in said passage, pin retaining plugs screwed into said piston at each end of said pin, grooves extending transversely across the ends of said plugs, and plug locking elements comprising a wire seated in each transverse groove in said plugs and engaging said piston.

4. In combination, a piston, a piston connecting rod, a rotatable wrist pin assembling said piston and rod, pin retaining plugs screwed into said piston at each end of said pin and each provided with a transverse groove in its outer end, and plug locking elements each comprising a wire seated in each of said grooves with its ends extending into said piston.

5. In combination, a piston, a piston connecting rod, a wrist pin assembling said piston and rod, shorter than the diameter of said piston and rotatably mounted in said piston and rod, a plug inserted in said piston at each end of said pin, a groove traversing the end of each plug, holes in said piston at each end of each of said grooves, and an element seated in each groove and extending into said holes adjacent the ends of its respective groove.

6. In combination, a piston having inwardly projecting bosses, a piston rod located between the bosses, said bosses and rod being bored to provide an aligned passage therethrough, a wrist pin arranged in said passage and connecting said piston and rod and having its ends spaced from the outer ends of said passage, plugs screw-threaded in the outer ends of the bosses in abutting relation to the ends of the wrist pin, and means for securing the plugs against rotation.

WILLIAM E. BAKER.